United States Patent [19]

Yasuoka

[11] Patent Number: 4,564,741

[45] Date of Patent: Jan. 14, 1986

[54] ARTICULATION MECHANISM OF AN ARC WELDING ROBOT

[75] Inventor: Hirotoshi Yasuoka, Aichi, Japan

[73] Assignee: Mitsubishi Denki Kabushiki Kaisha, Tokyo, Japan

[21] Appl. No.: 574,217

[22] Filed: Jan. 26, 1984

[30] Foreign Application Priority Data

Jan. 26, 1983 [JP] Japan .................... 58-10881

[51] Int. Cl.$^4$ ............................. B23K 9/12
[52] U.S. Cl. ................... 219/125.1; 901/29; 901/42
[58] Field of Search ........... 219/125.1, 125.11, 124.22; 901/29, 25, 26, 28, 42, 41, 43; 74/409, 440

[56] References Cited

U.S. PATENT DOCUMENTS

| Re. 28,437 | 6/1975 | Devol et al. | 901/29 |
| 3,543,593 | 12/1970 | Haaker et al. | 901/29 |
| 4,399,718 | 8/1983 | Zimmer | 74/409 |

FOREIGN PATENT DOCUMENTS 530254 12/1940 United Kingdom ................. 74/409

Primary Examiner—Clifford C. Shaw
Attorney, Agent, or Firm—Sughrue, Mion, Zinn, Macpeak & Seas

[57] ABSTRACT

An articulation mechanism of an arc welding robot is provided with a driving arm and a driven arm, a motor being contained in the driving arm. A forked articulation housing extends from the tip end of the driven arm with a transmission gear mechanism being provided at one inner side thereof, and a position-shift preventing mechanism being provided in its other inner side. The transmission gear mechanism transmits a driving force from an output shaft of the motor to an input shaft of the driven arm. The position-shift preventing mechanism prevents the position-shift of the input and output shafts.

4 Claims, 3 Drawing Figures

ARTICULATION MECHANISM OF AN ARC WELDING ROBOT

BACKGROUND OF THE INVENTION

The present invention relates to an articulation mechanism of an arc welding robot, and more particularly to an articulation mechanism of an arc welding robot having a plurality of drive arms.

With reference to FIG. 1, which illustrates a conventional multi-articulation type arc welding robot, a swivel slide 2 is rotatably provided on the upper portion of a fixed table 1 on which a robot body is supported. A brachium section 3 is coupled to the swivel slide 2.

The brachium section 3 has a brachium 4 and links 5 and 6 coupled to the swivel slide 2. An antebrachium section 7 is coupled to one end of each of the brachium 4 and link 6 of the brachium section 3 and a welding torch 8 is supported at the tip end of the antebrachium section 7 through a plurality of wrists (not shown).

The swivel slide 2 is driven by a drive motor (not shown) incorporated into the fixed table 1 through a reduction mechanism and the welding torch 8 is driven by a drive motor 9 mounted on a side of the swivel slide 2.

In the conventional articulation mechanism of an arc welding robot just described, the mechanism is arranged such that the driving force of the motor for driving the swivel slide 2, the brachium section 3, and the respective wrists of the antebrachium section 7 is transmitted to the respective drive arms through chains, timing belts, or the like. As a result, the chains, timing belts, or the like, may be non-elastically elongated or deformed, or back-lash may be caused in the chains, the timing belts, or the like, as the robot repetitively moves with rapid acceleration/deceleration, resulting in a deterioration in the positioning accuracy of the welding torch.

In addition, although in recent years there has been a demand to develop an articulation mechanism of an arc welding robot having four wrists, for the purpose of optimizing the welding attitude, the practical application of a TIG arc welding robot, the practical application of a welding wire sensor, etc., such optimization has not been attained because the above-mentioned problem could not be solved.

SUMMARY OF THE INVENTION

An object of the invention is to provide an articulation mechanism of an arc welding robot which can very accurately position the welding torch.

In order to achieve the above-mentioned object, the articulation mechanism of an arc welding robot according to the present invention is characterized in that the mechanism comprises a drive arm containing a motor therein and provided with an articulation housing at its tip end, and a driven arm pivotally supported by the articulation housing of the drive arm and driven by the motor. A transmission gear mechanism is provided in one inner side of the articulation housing for transmitting the driving force of the motor from an output shaft of the motor to an input shaft of the driven arm, and a position-shift preventing mechanism is provided in the other inner side of the articulation housing for preventing the position-shift of the output and input shafts, the position-shift preventing mechanism including a chain carried by sprockets connected, respectively, to the output and input shafts and chain tensioners provided in the midst of the chain for holding the chain tensed.

DESCRIPTION OF THE PREFERRED EMBODIMENT

Figure 1:
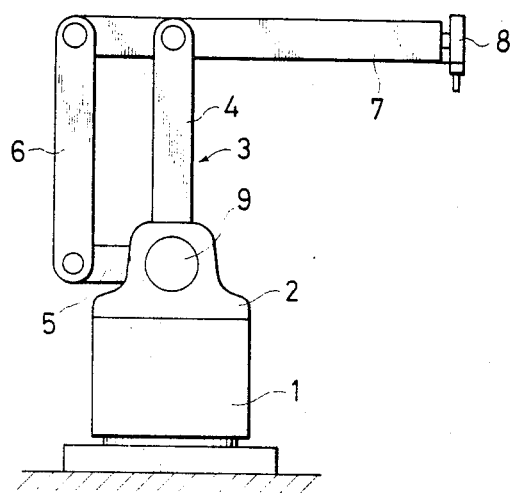
FIG. 1 is a schematic view showing a conventional multi-articulation type arc welding robot.

Referring to the drawings, a preferred embodiment of the present invention will be described.

Figure 2:
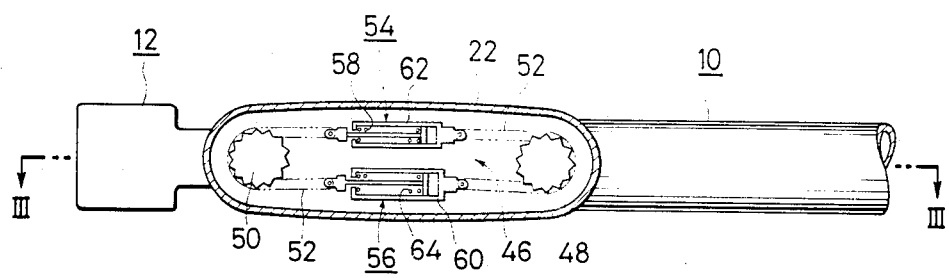
FIG. 2 is an illustration of the main part of a preferred embodiment of the articulation mechanism of an arc welding robot according to the present invention.
Figure 3:
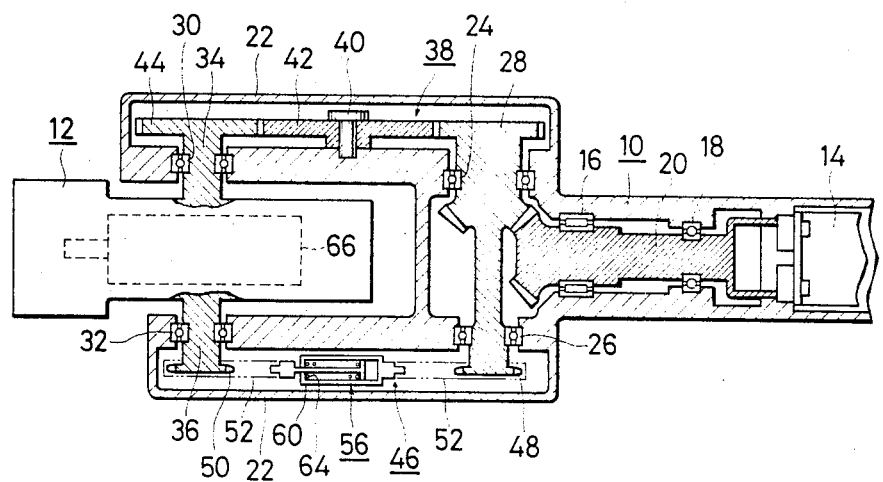
FIG. 3 is a cross-section along the III—III line in FIG. 2.

FIG. 2 shows a preferred embodiment of the articulation mechanism of an arc welding robot according to the present invention, while FIG. 3 shows the cross-section along the line III—III in FIG. 2.

In each drawing, an embodiment of a first wrist 10 which is a drive arm and a second wrist 12 which is a driven arm is illustrated. In FIG. 3, a motor 14 for rotating the second wrist 12 is incorporated in the first wrist 10 and a reduction gear 20 is rotatably supported by bearings 16 and 18 provided inside the first wrist 10. A forked articulation housing 22 which includes forked arm portions is provided at the tip end of the first wrist 10 and a reduction gear 28 which forms a portion of the output shaft of the motor 14 is rotatably supported by bearings 24 and 26 provided at the root portion of the articulation housing 22. Axis portions 34 and 36 of the second wrist 12 are rotatably supported by bearings 30 and 32 provided at the tip end of the articulation housing 22 to allow the second wrist 12 to be rotated by the motor 14. A transmission gear mechanism 38 for transmitting the driving force of the motor 14 from the reduction gear 28, which forms a portion of the output shaft of the motor 14, to the axis portions 34 and 36, which form the input shafts of the second wrist 12, is provided in one inner side of the articulation housing 22. That is, an idler gear 42 engaged with the reduction gear 28 is rotatably provided on a shaft 40 projecting from the one inner side of the articulation housing 22, and a reduction gear 44 engaged with the idler gear 42 is provided at the end portion of the axis portion 34 of the second wrist 12. Although the transmission gear mechanism 38 has a single idler gear 42 in this embodiment, it may be constituted by plural idler gears 42 in odd numbers such as three, five, etc.

A position-shift preventing mechanism 46 for preventing the position-shift of the reduction gear 28 which is a portion of the output shaft of the motor 14 and the axis portions 34 and 36 which operate as the input shafts of the second wrist 12 is provided in the other inner side of the articulation housing 22. That is, sprockets 48 and 50 are provided at the respective tip ends of the reduction gear 28 and the axis portion 36 of the second wrist 12 and a chain 52 is carried by the sprockets 48 and 50. A pair of chain tensioners 54 and 56 are provided in the midst of the chain 52. The chain tensioners 54 and 56 have compression springs 62 and 64 provided in casings 58 and 60 respectively, the compression forces of the respective compression springs 62 and 64 being set to be equal to each other. In this embodiment, the compression force of each of the compression springs 62 and 64 is set to a predetermined value which is equal to or larger than the load torque, to thereby always maintain the chain tensed.

The reason why the chain tensioners 54 and 56 are provided at the upper and lower portions of the chain 52 respectively, with a single tensioner at each portion, is that the respective amounts of abrasion of the sprockets 48 and 50 are made equal to each other so as to cause the position-shift preventing mechanism 46 to sufficiently exhibit its position-shift prevention function.

Thus, according to the present invention, since the transmission gear mechanism 38 is provided in one inner side of the articulation housing 22 and the position-shift preventing mechanism 46 is provided in the other inner side of the articulation mechanism 22, it is possible to very accurately position the welding torch, as will be described later. As a result it is possible to incorporate a motor 66 for driving a third wrist (not shown) into the second wrist 12 as shown by a dotted line in FIG. 3.

The embodiment of the present invention is arranged in the manner as described above and the operation thereof will now be described.

The driving force of the motor 14 is transmitted to the second wrist 12 through the reduction gears 20 and 28, the idler gear 42 and the reduction gear 44 of the transmission gear mechanism 38. Since the rotating direction of the reduction gear 28 agrees with that of the axis portions 34 and 36 of the second wrist 12 and the chain 52 of the position-shift preventing mechanism 46 is always maintained tensed with a compression force which is equal to or larger than the load torque, the positional relation between the reduction gear 28 and the axis portions 34 and 36 does not change even in the case where back-lash occurs in the transmission mechanism 38. As a result, the accurate positioning of the welding torch can be maintained even in the case where the motor 66 is incorporated in the second wrist 12 as shown by a dotted line in FIG. 3 so that a welding torch is supported by a third wrist. Accordingly, it becomes possible to produce an arc welding robot having a three-axes wrist arrangement and to provide an arc welding robot which is superior in operation.

As described above, according to the present invention, since a transmission gear mechanism is provided in the one inner side of an articulation housing and a position-shift preventing mechanism is provided in the other inner side of the articulation mechanism, highly accurate welding torch positioning can be realized and as a result, it becomes possible to provide an arc welding robot having a three-axes wrist mechanism which is superior in operation.

What is claimed is:

1. An articulation mechanism of an arc welding robot comprising a drive arm containing a motor therein and provided with an articulation housing at its tip end, and a driven arm pivotally supported by said articulation housing provided at the tip end of said drive arm and driven by said motor, and a transmission gear mechanism provided in one inner side of said articulation housing for transmitting the driving force of said motor from an output shaft of said motor to an input shaft of said driven arm and a position-shift preventing mechanism provided in the other inner side of said articulation housing for preventing the position-shift of said output and input shafts, wherein said articulation housing includes forked arm portions, said driven arm being provided with first and second axes portions extending into said forked arm portions, said first and second axes portions being coupled to said transmission gear mechanism and said position-shift preventing mechanism, respectively.

2. An articulation mechanism of an arc welding robot according to claim 1, wherein said position-shift preventing mechanism includes first and second sprockets coupled respectively to said transmission gear mechanism and one of said axis portions, a chain carried by said sprockets and chain tensioners for maintaining said chain tensed.

3. An articulation mechanism of an arc welding robot according to claim 2, further including means for always maintaining said chain tensed by said chain tensioners with a compression force which is equal to or larger than the load torque.

4. An articulation mechanism of an arc welding robot according to claim 1, wherein said transmission mechanism includes an idler gear and a plurality of reduction gears.

* * * * *